(12) United States Patent
Knafl et al.

(10) Patent No.: US 11,031,633 B2
(45) Date of Patent: Jun. 8, 2021

(54) SHIP OR POWER PLANT VOLTAGE SUPPLY SYSTEM

(71) Applicant: MAN DIESEL & TURBO SE, Augsburg (DE)

(72) Inventors: Alexander Knafl, Augsburg (DE); Gunnar Stiesch, Neusäß (DE); Bernd Friedrich, Eichenau (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 307 days.

(21) Appl. No.: 15/888,818

(22) Filed: Feb. 5, 2018

(65) Prior Publication Data

US 2018/0226689 A1  Aug. 9, 2018

(30) Foreign Application Priority Data

Feb. 6, 2017  (DE) .......................... 102017102257.0

(51) Int. Cl.
| | |
|---|---|
| *H01M 10/42* | (2006.01) |
| *B60L 1/00* | (2006.01) |
| *H02J 1/00* | (2006.01) |
| *H02J 7/34* | (2006.01) |
| *B60L 58/21* | (2019.01) |
| *H02J 1/10* | (2006.01) |
| *H01M 50/20* | (2021.01) |
| *B63J 3/02* | (2006.01) |

(52) U.S. Cl.
CPC ............. *H01M 10/425* (2013.01); *B60L 1/00* (2013.01); *B60L 58/21* (2019.02); *H01M 50/20* (2021.01); *H02J 1/00* (2013.01); *H02J 1/10* (2013.01); *H02J 7/34* (2013.01); *B60L 2200/32* (2013.01); *B63J 3/02* (2013.01); *H01M 2010/4271* (2013.01); *H01M 2010/4278* (2013.01); *H01M 2220/20* (2013.01); *Y02T 10/70* (2013.01)

(58) Field of Classification Search
None
See application file for complete search history.

(56) References Cited

U.S. PATENT DOCUMENTS

| | | | | |
|---|---|---|---|---|
| 2009/0085553 | A1* | 4/2009 | Kumar ................ | H01M 10/425 323/351 |
| 2011/0234006 | A1* | 9/2011 | Deng .................. | H01M 10/441 307/71 |
| 2012/0248881 | A1* | 10/2012 | Chang .................. | H02J 7/0026 307/87 |
| 2013/0078498 | A1* | 3/2013 | Favaretto ................ | B60K 1/04 429/158 |
| 2013/0167752 | A1* | 7/2013 | Barbee ...................... | B60L 7/24 105/1.4 |
| 2015/0127205 | A1* | 5/2015 | Brochhaus .......... | H01M 10/482 701/22 |
| 2018/0131229 | A1* | 5/2018 | Valin ....................... | H01M 4/62 |

* cited by examiner

*Primary Examiner* — Jared Fureman
*Assistant Examiner* — Joel Barnett
(74) *Attorney, Agent, or Firm* — Cozen O'Connor

(57) ABSTRACT

A voltage supply system for supplying an electric consumer with an electric target voltage and an electric target energy, with a plurality of automotive traction battery modules. Each automotive traction battery module has an electric actual voltage and an electric actual energy. The automotive traction battery modules are interconnected dependent on the electric target voltage, the electric actual voltage, the electric target energy, and the electric actual energy in series connections and/or in a parallel connection to form at least one traction battery module group.

11 Claims, 2 Drawing Sheets

SHIP OR POWER PLANT VOLTAGE SUPPLY SYSTEM

BACKGROUND OF THE INVENTION

1. Field of the Invention

The invention relates to a ship voltage supply system or power plant voltage supply system.

2. Description of the Related Art

Electric drives for hybridising a drive system play an ever more prominent role on ships. For operating electric consumers of a ship such as for example for operating electric machines which serve for driving the ship, electric ship voltage supply systems are needed in order to supply the electric machine or the electric consumer with an adequate electric voltage or adequate electric energy. There is a need for a ship voltage supply system with little expenditure and accordingly with low costs that can provide an electric consumer of a ship with a desired electric target voltage and a desired electric target energy. Comparable requirements also exist in stationary applications in power plants.

SUMMARY OF THE INVENTION

One aspect of the invention is based on creating a new type of ship or power plant voltage supply system.

A ship voltage supply system according to one aspect of the invention comprises a plurality of automotive traction battery modules, wherein each automotive traction battery module has an electric actual voltage and an electric actual energy. Dependent on the electric target voltage, the electric actual voltage, the electric target energy, and the electric actual energy the plurality of automotive traction battery modules are interconnected in series connections to form a plurality of traction battery module sub-groups and/or in a parallel connection to form at least one traction battery module group.

With the present invention it is proposed to utilise automotive traction battery modules in a ship voltage supply system, which automotive traction battery modules are known from automotive applications in the motor vehicle sector. However, since such automotive traction battery modules deviate with respect to their electric actual voltage and/or electric actual energy from the target voltage and/or the target energy of the electric consumer of the ship, the invention proposes a defined interconnection of the automotive traction battery modules. The invention makes it possible with little expenditure using automotive traction battery modules to provide a ship voltage supply system supplies an electric consumer of the ship, for example an electric machine serving to drive the ship, with a desired electric target voltage and electric target energy.

In particular when the electric actual voltage of the automotive traction battery modules corresponds to the electric target voltage of the electric consumer, a plurality of automotive traction battery modules are connected in parallel to form at least one traction battery module group. In particular when the electric actual voltage of the automotive traction battery modules is smaller than the electric target voltage of the electric consumer, a plurality of automotive traction battery modules are connected in series to form a traction battery module subgroup and a plurality of traction battery module subgroups connected in parallel to form at least one traction battery module group. Such an electrical interconnection of the automotive traction battery modules is preferred in order to supply the electric consumer of the ship with the electric target voltage and electric target energy.

Preferentially, the automotive traction battery modules are activatable via an automotive CAN bus system. By way of this, an activation of the automotive traction battery modules can take place with little effort and use of automotive CAN bus systems. Because of this, a simple and cost-effective ship voltage supply system can be provided.

According to a further development, the ship voltage supply system comprises a plurality of traction battery module groups that are electrically connected in parallel, wherein the number of the automotive traction battery modules for each traction battery module group is dependent on the control signal capacity of the automotive CAN bus system, wherein the automotive traction battery modules of each traction battery module group in each case are connected to a group-individual automotive CAN bus system, wherein the number of the traction battery module groups is dependent on the electric target energy of the electric consumer and wherein the group individual automotive CAN bus systems are connected to a higher-level control device. This further development is particularly preferred in order to provide a ship voltage supply system using automotive traction battery modules and automotive CAN bus system, which provides an electric consumer of the ship with the desired electric target voltage and electric target energy.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

One aspect of the invention relates to a ship voltage supply system 10 for supplying an electric consumer of a ship with an electric target voltage and an electric target energy.

One aspect of the invention also relates to a power plant voltage supply system for supplying an electric consumer of a power plant with an electric target voltage and an electric target energy. In the following, the invention is described making reference to ship voltage supply systems. However, aspects of the inventions also apply to power plant voltage supply systems.

The ship voltage supply system 10 comprises a plurality of automotive traction battery modules 11, wherein each automotive traction battery module 11 has or provides an electric actual voltage and an electric actual energy.

The automotive traction battery modules 11 are interconnected dependent on the electric target voltage, the electric actual voltage, the electric target energy and the electric actual energy to form a plurality of traction battery module subgroups in series connections and/or to form at least one traction battery module group in a parallel connection.

Figure 1:
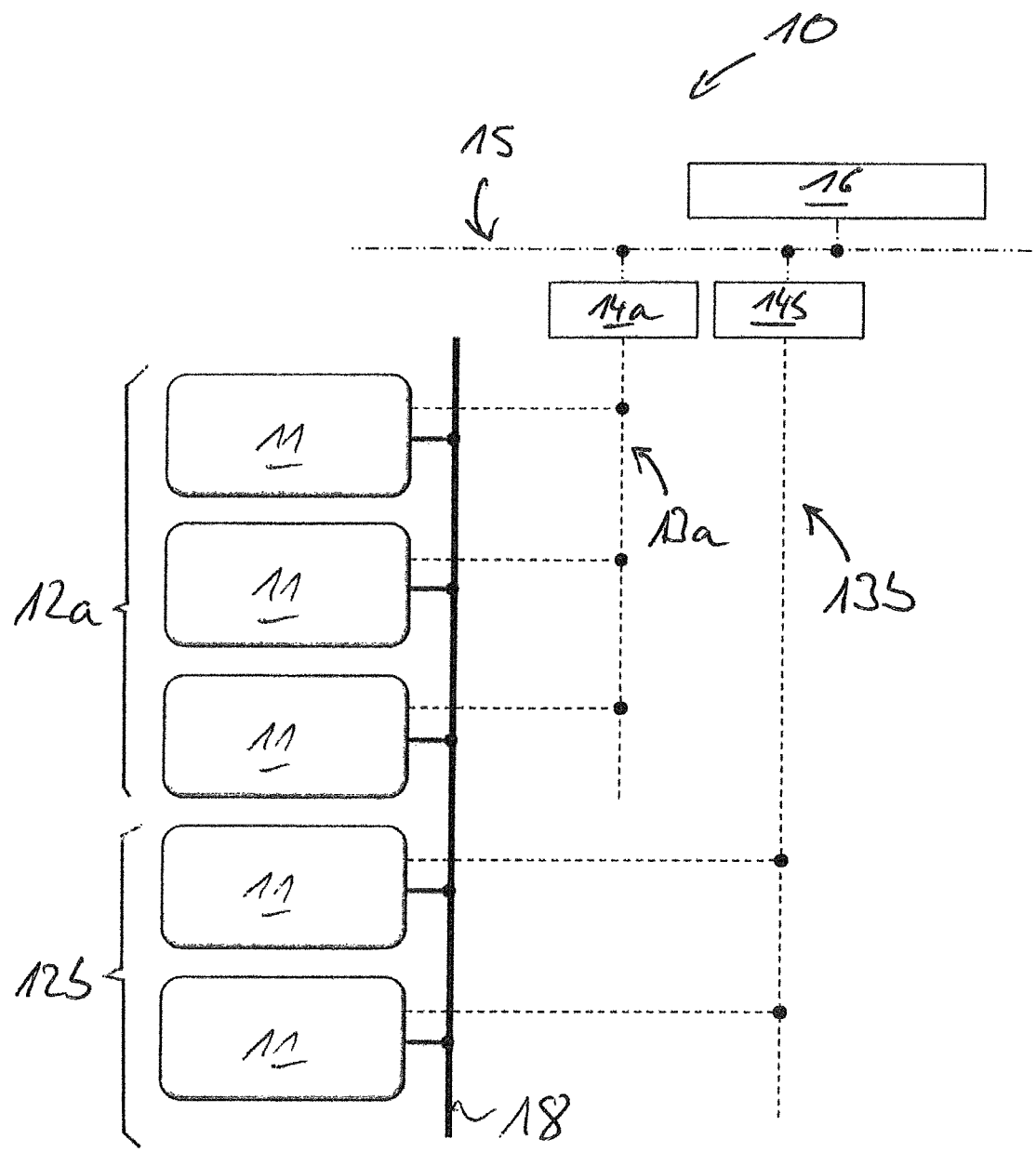
FIG. 1 is a ship voltage supply system according to the invention.

FIG. 1 shows a first exemplary embodiment of a ship voltage supply system 10 according to one aspect of the invention with a plurality of automotive traction battery modules 11, wherein in FIG. 1 five such automotive traction battery modules 11 are exemplarily shown. All automotive traction battery modules 11 are interconnected in the sense of parallel connections to form at least one traction battery module group, namely in FIG. 1 two traction battery module groups 12a, 12b, wherein the traction battery module group 12a in FIG. 1 comprises three automotive traction battery modules 11 and the traction battery module group 12b two automotive traction battery modules 11.

In FIG. 1, it is not only the automotive traction battery modules 11 of the respective traction battery module group 12a, 12b that are each connected parallel to one another, but the traction battery module groups 12a, 12b are also connected parallel to one another so that all automotive traction battery modules 11 of the traction battery module groups 12a, 12b are connected in the sense of a parallel connection to a common voltage supply line 18, via which the at least one electric consumer of the ship, in particular an electric machine serving as drive source, can be supplied with the desired target voltage and the desired target energy.

In FIG. 1, the actual voltage of the automotive traction battery modules 11 corresponds to the electric target voltage of the electric consumer, the number of the automotive traction battery modules 11 interconnected in parallel depends on the desired electric target energy.

Activation of the automotive traction battery modules 11 is effected via automotive CAN bus systems. Such automotive CAN bus systems have a limited control signal capacity. For this reason, the automotive traction battery modules 11 of each traction battery module group 12a, 12b are each activated via a group-individual automotive CAN bus system 13a, 13b, namely the automotive traction battery modules 11 of the traction battery module group 12a via the automotive CAN bus system 13a and the automotive traction battery modules 11 of the traction battery module group 12b via the automotive CAN bus system 13b. Thus controllers 14a, 14b coordinate the transmission of the control signals via the respective automotive CAN bus system 13a, 13b, wherein the automotive CAN bus systems 13a, 13b or the bus controllers 14a, 14b are connected to a higher-level bus system 15 in order to exchange data with a higher-level control device via this higher-level bus system 15.

Figure 2:
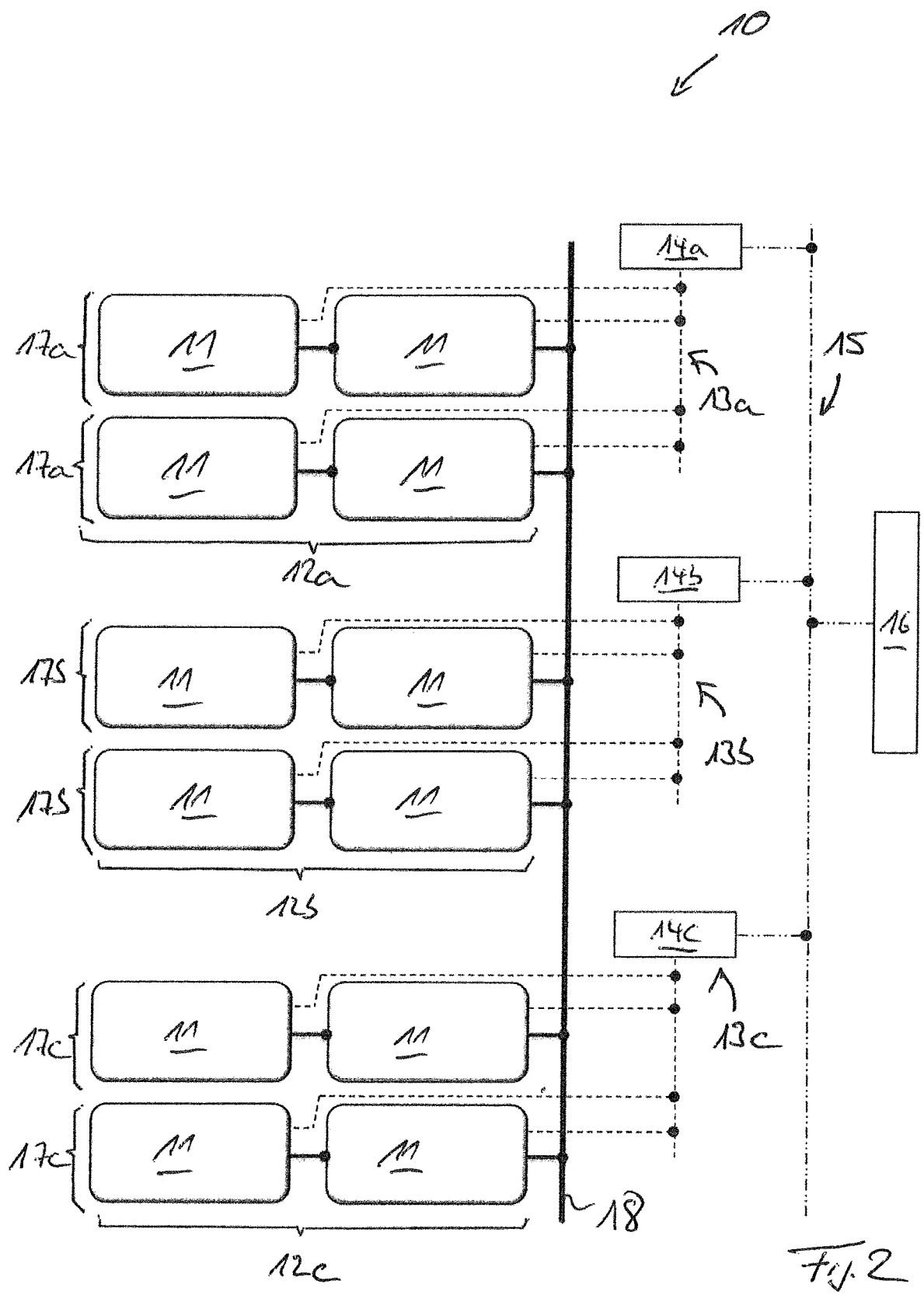
FIG. 2 is a ship voltage supply system according to the invention.

A further ship voltage supply system 10 according to the invention is shown by FIG. 2. In the case of the ship voltage supply system 10 of FIG. 2, a total of 12 automotive traction battery modules 11 are present, wherein in each case four of the automotive traction battery modules 11 are interconnected to form a traction battery module group 12a, 12b, 12c. Within each traction battery module group 12a, 12b and 12c, two of the four automotive traction battery modules 11 are each interconnected in the sense of a series connection to form traction battery module subgroups 17a, 17b and 17c, wherein the traction battery module subgroups 17a, 17b and 17c are interconnected in the sense of a parallel connection to form the respective traction battery module group 12a, 12b and 12c.

Accordingly, the electric actual voltage of the automotive traction battery modules 11 is smaller in FIG. 2 than the electric target voltage of the electric consumer of the ship, wherein the number of the automotive traction battery modules 11a which are interconnected in series and interconnected to form a traction battery module subgroup 17a, 17b and 17c is dependent on the ratio of the actual voltage to the target voltage.

The number of the traction battery module groups 12a, 12b, 12c is dependent on the ratio of the actual energy to the needed target energy. The traction battery module groups 12a, 12b, 12c which are connected in parallel are connected to a common voltage supply line 18.

A group-individual automotive CAN bus system 13a, 13b and 13c again interacts with each traction battery module group 12a, 12b, 12c. Respect bus controllers 14a, 14b, 14c are coupled to a higher-level bus system 15 in order to communicate with the higher-level control device 16. The number of the automotive traction battery modules 11 of each traction battery module group 12a, 12b, 12c again depends on the control signal capacity of the automotive CAN bus system.

Using known and available automotive traction battery modules 11 and known and available automotive CAN bus systems 13, 15, the invention allows building-up an electric ship voltage supply system 10 in order to supply at least one electric consumer of a ship with a desired electric target voltage and a desired electric target energy, so that the ship voltage supply system 10 can be build-up cost-effectively and reliably using assemblies known per se. The electric actual energy of known automotive traction battery modules 11 is between 10 kWh and 100 kWh, in particular in the order of magnitude of 20 kWh. The electric target energy of the electric consumer of the ship is typically greater than 1,000 kWh, typically of the order of magnitude of a plurality of MWh.

With the parallel arrangements of the automotive traction battery modules 11 (see FIG. 1) and with the parallel arrangements of automotive traction battery modules 11 connected in series or with the parallel arrangements of traction battery module subgroups 17 (see FIG. 2), a very high redundancy materialises. Should a defect occur in an automotive traction battery module 11 and the same has to be switched off for protection as a consequence, the electric voltage supply can still be maintained. With a correspondingly large number of parallel or automotive traction battery modules 11 or parallel traction battery module subgroups 17, a power or energy deficit is low. Such a defect case is detected via the automotive CAN bus system. The failure of automotive traction battery modules 11 is correspondingly signalled to a higher-level guidance system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A ship voltage supply system configured to supply an electric consumer of a ship with an electric target voltage and an electric target energy, comprising:
 a plurality of automotive traction battery modules, wherein each automotive traction battery module has an electric actual voltage and an electric actual energy;
 wherein the plurality of automotive traction battery modules are interconnected based at least in part on the electric target voltage, the electric actual voltage, the electric target energy, and the electric actual energy;
 an automotive CAN bus system; and
 a controller coupled to each of the plurality of automotive traction battery modules via the automotive CAN bus system and configured to:
  switch off a defective automotive traction battery module and,
  based at least in part on the electric target voltage, the electric actual voltage, the electric target energy, and the electric actual energy, activate the plurality of automotive traction battery modules to be interconnected at least one of:
  in a series connection to form a plurality of traction battery module subgroups; and
  in a parallel connection to form at least one traction battery module group.

2. The ship voltage supply system according to claim 1, wherein when the electric actual voltage of the plurality of automotive traction battery modules corresponds to the electric target voltage of the electric consumer, the plurality of automotive traction battery modules are connected in parallel to form the at least one traction battery module group.

3. The ship voltage supply system according to claim 2, wherein when the electric actual voltage of the plurality of automotive traction battery modules is smaller than the electric target voltage of the electric consumer, the plurality of automotive traction battery modules are connected in series to form each traction battery module subgroup and the plurality of traction battery module subgroups are connected in parallel to form the at least one traction battery module group.

4. The ship voltage supply system according to claim 1, wherein when the electric actual voltage of the plurality of automotive traction battery modules is smaller than the electric target voltage of the electric consumer, the plurality of automotive traction battery modules are connected in series to form each traction battery module subgroup and the plurality of traction battery module subgroups are connected in parallel to form the at least one traction battery module group.

5. The ship voltage supply system according to claim 1, wherein each automotive traction battery module is configured to be activated by the automotive CAN bus system.

6. The ship voltage supply system according to claim 5, wherein a number of the plurality of automotive traction battery modules of each traction battery module group is based at least in part on a control signal capacity of the automotive CAN bus system.

7. The ship voltage supply system according to claim 6, wherein a plurality of traction battery module groups are electrically connected in parallel,
 wherein the number of the plurality of automotive traction battery modules of each traction battery module group is based at least in part on the control signal capacity of the automotive CAN bus system,
 wherein the plurality of automotive traction battery modules of each traction battery module group are each connected to a group-individual automotive CAN bus system,
 wherein the number of traction battery module groups is based at least in part on a target energy of the electric consumer, and
 wherein the group-individual automotive CAN bus systems are connected to a higher-level control device.

8. The ship voltage supply system to claim 1, wherein the actual energy of each automotive traction battery module is between 10 to 100 kWh, and wherein a target energy of the electrical consumer is greater than 1,000 kWh.

9. A power plant voltage supply system configured to supply an electric consumer of a power plant with an electric target voltage and an electric target energy, comprising:
 a plurality of automotive traction battery modules, wherein each automotive traction battery module has an electric actual voltage and an electric actual energy; and
 wherein the plurality of automotive traction battery modules are interconnected based at least in part on the electric target voltage, the electric actual voltage, the electric target energy, and the electric actual energy;
 an automotive CAN bus system; and
 a controller coupled to each of the plurality of automotive traction battery modules via the automotive CAN bus system and configured to:
  switch off a defective automotive traction battery module and,
  based at least in part on the electric target voltage, the electric actual voltage, the electric target energy, and the electric actual energy, activate the plurality of automotive traction battery modules to be interconnected at least one of:
  in a series connection to form a plurality of traction battery module subgroups; and
  in a parallel connection to form at least one traction battery module group.

10. The power plant voltage supply system according to claim 9, wherein when the electric actual voltage of the plurality of automotive traction battery modules corresponds to the electric target voltage of the electric consumer, the plurality of automotive traction battery modules are connected in parallel to form the at least one traction battery module group.

11. The power plant voltage supply system according to claim 9, wherein when the electric actual voltage of the plurality of automotive traction battery modules is smaller than the electric target voltage of the electric consumer, the plurality of automotive traction battery modules are connected in series to form each traction battery module subgroup and the plurality of traction battery module subgroups are connected in parallel to form the at least one traction battery module group.

* * * * *